July 29, 1941.  T. L. GATKE  2,251,126
MOLDED COMPOSITION SLIPPER BEARING
Filed July 31, 1940
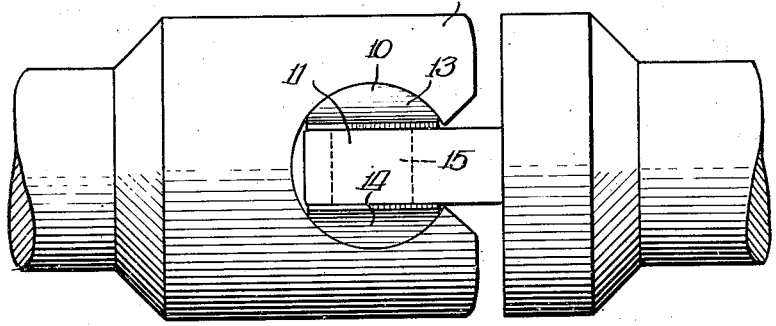
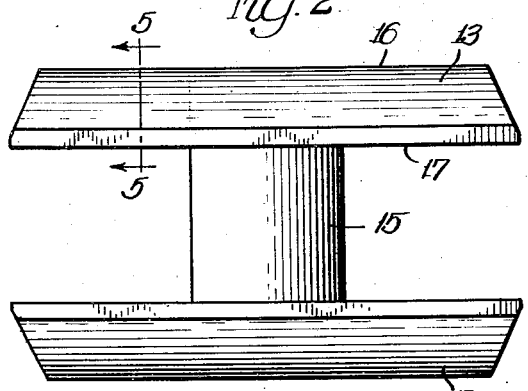 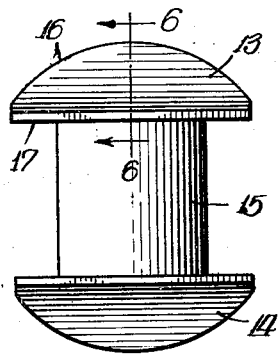
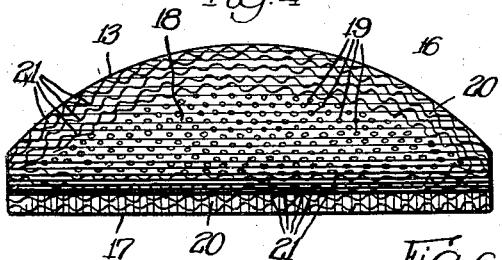 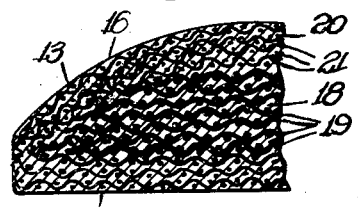
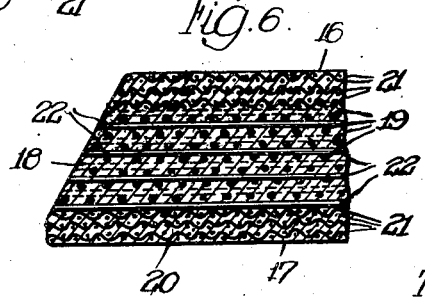 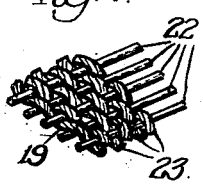
INVENTOR.
Thomas L. Gatke,
BY Cromwell, Greist & Warden
attys.

Patented July 29, 1941

2,251,126

UNITED STATES PATENT OFFICE 2,251,126

MOLDED COMPOSITION SLIPPER BEARING

Thomas L. Gatke, Oak Park, Ill.

Application July 31, 1940, Serial No. 348,807

3 Claims. (Cl. 64—7)

The present invention has to do with slipper bearings for universal couplings, and is particularly concerned with molded composition slipper bearings of a heavy duty type suitable for use in rolling mill drives.

The object of the invention is to provide a slipper bearing of new and improved molded composition, which will give better service than the metal slipper bearings heretofore used for the same purposes, will not wear out or break down as rapidly under the pounding and pressures to which subjected, is quieter in operation, and is comparatively inexpensive to manufacture.

While this new slipper bearing is especially applicable to rolling mill drives and other universal coupling mechanisms where extremely high pressures and torques are met with, it can of course also be used to advantage in connection with smaller size couplings.

Other more detailed objects and advantages of the invention will be apparent to those skilled in the art upon a full understanding of the nature and construction of the improved slipper bearing.

A preferred embodiment of the invention is presented herein, for the purpose of exemplification. It will of course be appreciated that the invention is capable of incorporation in other structurally modified forms coming equally within the scope of the appended claims.

In the accompanying drawing:

Fig. 1 is a side view of a universal coupling equipped with a slipper bearing constructed in accordance with the invention;

Fig. 2 is a side view of the slipper bearing, removed from the coupling;

Fig. 3 is an end view of the slipper bearing;

Fig. 4 is an enlarged end view of one of the two segments which together constitute the slipper bearing;

Fig. 5 is a transverse section through the segment shown in Fig. 4, taken on the line 5—5 of Fig. 2;

Fig. 6 is a longitudinal section through the same segment, taken on the line 6—6 of Fig. 3; and Fig. 7 is an enlarged perspective view of a small piece of one of the woven fabric strips which make up the laminated cores of the segments.

The improved slipper bearing is shown in Fig. 1 at 10, in operative position with respect to complementary male and female heads 11 and 12 of a universal coupling. As will be observed in Figs. 2 and 3, the slipper bearing includes primarily two cylindrical segments 13 and 14 and a center block 15. The segments 13 and 14—with which the present invention is more particularly concerned—are of non-metallic construction. As the segments 13 and 14 are duplicates of each other, only one of the segments—namely the segment 13—will be described.

The segment 13 is made of a non-metallic molded composition, such as a synthetic resinous compound, or other compound of any type suitable for bearing purposes, and contains laminated fabric layers which are impregnated with, and molded under pressure in, the non-metallic compound. The segment 13 is of crescent-shaped cross section, and has a curved outer surface 16 and a flat inner surface 17. The segment is characterized by a laminated core 18 which consists of a plurality of flat woven fabric strips 19 which are arranged in a stack parallel to the flat inner surface 17 of the segment and decrease progressively in width toward the curved outer surface 16. The segment is further characterized by a laminated envelope 20 about the core 18 consisting of other woven fabric strips 21, which last mentioned strips follow generally the contour of the outer and inner surfaces 16 and 17 of the segment. All of the fabric strips in both the core 18 and the envelope 20 are molded together into a solid unit. The fabric strips 19 in the core 18, and the non-metallic composition impregnating and binding such strips together are of such character as to provide strength in the segment and shock-absorbing qualities sufficient to withstand the most severe impacts, whereas the fabric of the strips 21 in the envelope 20 and the non-metallic compound impregnating and bonding such strips together are of such character as to provide hardness in the surface of the segment and wear resisting qualities of a high order. In other words, the laminated core 18 constitutes a relatively soft but tough center while the laminated envelope 20 constitutes a relatively hard but highly wear resistant bearing surface, the core and the envelope cooperating in service to present a bearing member of such design and construction as to withstand the most severe usage to which slipper bearings of this general type are ever put.

The shaping of the core 18 and envelope 20, and the general arrangement of the laminations of the strips 19 and 21 therein, are preferably substantially as shown in Figs. 4, 5 and 6, although it will of course be appreciated that the invention is not limited in its scope to the exact details shown in those views.

The woven fabric strips 19 in the core 18 may advantageously, though not necessarily, be provided with parallel wires 22. These wires 22 extend longitudinally of the core and are held together in uniformly spaced relation by the transversely extending yarns 23 which complete the strips. By arranging the wires 22 so that they extend only in one direction, and by substantially encasing them in the yarns 23, metal-to-metal contact between not only the wires of each strip but the wires of adjoining strips is prevented, thereby eliminating any tendency of the core to stratify, as is frequently the case in reinforced structures where wire mesh is used.

I claim:

1. In a slipper bearing member of crescent-shaped cross section having a curved outer surface and a flat inner surface, a laminated core consisting of a plurality of flat woven fabric strips which are arranged in a stack parallel to the flat inner surface of the member, and a laminated envelope about the core consisting of other woven fabric strips which follow the contour of the outer and inner surfaces of the member, all of said strips in the core and envelope being molded together into a solid unit.

2. In a slipper bearing member of crescent-shaped cross section having a curved outer surface and a flat inner surface, a laminated core consisting of a plurality of flat woven fabric strips which are arranged in a stack parallel to the flat inner surface of the member and decreasing progressively in width toward the curved outer surface, and a laminated envelope about the core consisting of other woven fabric strips which follow the contour of the outer and inner surfaces of the member, all of said strips in the core and envelope being molded together into a solid unit.

3. In a slipper bearing member of crescent-shaped cross section having a curved outer surface and a flat inner surface, a relatively soft but tough laminated core consisting of a plurality of flat woven fabric strips which are arranged in a stack parallel to the flat inner surface of the member and decreasing progressively in width toward the curved outer surface, and a relatively hard but wear resistant laminated envelope about the core consisting of other woven fabric strips which follow the contour of the outer and inner surfaces of the member, all of said strips in the core and envelope being molded together into a solid unit.

THOMAS L. GATKE.